United States Patent
Willig et al.

(10) Patent No.: US 6,705,164 B2
(45) Date of Patent: Mar. 16, 2004

(54) ROTATION RATE SENSOR

(75) Inventors: Rainer Willig, Tamm (DE); Andreas Thomae, Tuebingen (DE); Burkhard Kuhlmann, Eningen (DE); Joerg Hauer, Reutlingen (DE); Udo-Martin Gomez, Leonberg (DE); Siegbert Goetz, Gerlingen (DE); Christian Doering, Stuttgart (DE); Michael Fehrenbach, Reutlingen (DE); Wolfram Bauer, Tuebingen (DE); Udo Bischof, Wannweil (DE); Reinhard Neul, Stuttgart (DE); Karsten Funk, Palo Alto, CA (US); Markus Lutz, Sunnyvale, CA (US); Gerhard Wucher, Reutlingen (DE); Jochen Franz, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/258,336
(22) PCT Filed: Feb. 14, 2002
(86) PCT No.: PCT/DE02/00524
§ 371 (c)(1),
(2), (4) Date: Mar. 19, 2003
(87) PCT Pub. No.: WO02/066929
PCT Pub. Date: Aug. 29, 2002

(65) Prior Publication Data
US 2003/0154788 A1 Aug. 21, 2003

(30) Foreign Application Priority Data
Feb. 21, 2001 (DE) .......................... 101 08 197

(51) Int. Cl.$^7$ .............................................. G01C 19/00
(52) U.S. Cl. ............................... 73/504.12; 73/514.32; 73/514.38
(58) Field of Search ......................... 73/504.02, 504.03, 73/504.04, 504.12, 504.16, 514.32, 514.38

(56) References Cited

U.S. PATENT DOCUMENTS

| | | | |
|---|---|---|---|
| 5,396,797 A | 3/1995 | Hulsing | |
| 5,604,312 A | 2/1997 | Lutz | |
| 5,635,638 A | 6/1997 | Geen | |
| 5,728,936 A | 3/1998 | Lutz | |
| 6,067,858 A | 5/2000 | Clark et al. | |

FOREIGN PATENT DOCUMENTS

| | | |
|---|---|---|
| DE | 44 14 237 | 10/1995 |
| DE | 44 28 405 | 2/1996 |
| DE | 44 42 033 | 5/1996 |
| DE | 195 19 488 | 11/1996 |
| DE | 195 30 007 | 2/1997 |
| DE | 196 41 284 | 5/1998 |
| DE | 100 35 605 | 1/2001 |
| EP | 0 911 606 | 4/1999 |
| WO | WO 98 15799 | 4/1998 |

*Primary Examiner*—Richard A. Moller
(74) *Attorney, Agent, or Firm*—Kenyon & Kenyon (57) ABSTRACT

A yaw-rate sensor including a first and a second Coriolis element that are arranged side-by-side above a surface of a substrate. The Coriolis elements are induced to oscillate parallel to a first axis Y. Due to a Coriolis force, the Coriolis elements are deflected in a second axis X which is perpendicular to the first axis Y. The oscillations of the first and second Coriolis elements occur in phase opposition to each other on paths which, without the effect of a Coriolis force, are two straight lines parallel to each other.

13 Claims, 6 Drawing Sheets

ROTATION RATE SENSOR

FIELD OF THE INVENTION

The present invention relates to a yaw-rate sensor.

BACKGROUND INFORMATION

Yaw-rate sensors in which a first and a second Coriolis element are arranged on the surface of a substrate are referred to in U.S. Pat. No. 5,728,936. The Coriolis elements are induced to oscillate in a first axis. The deflections of the Coriolis elements due to a Coriolis force in a second axis, which is parallel to the substrate, are verified.

SUMMARY OF THE INVENTION

In contrast, the yaw-rate sensor according to the present invention may provide that the Coriolis forces and forces which occur due to an angular acceleration of the substrate have different directions. The exemplary yaw-rate sensor according to the present invention is therefore largely insensitive with respect to angular accelerations.

If the gravitational centers of the Coriolis elements move perpendicular to a straight connecting line between the gravitational centers, then on average over time, the deflections of the Coriolis elements due to the Coriolis force lie on one and the same axis, in which an angular acceleration exerts no force component whatsoever. The Coriolis elements are induced to oscillate particularly easily by a drive element which transmits driving forces through springs. In this case, the Coriolis element may be suspended completely on this drive element. Electrostatic comb drives may be provided on the drive elements as excitation arrangements. The Coriolis force may be verified in that the Coriolis element includes movable electrodes which are arranged opposite stationary electrodes. However, verification elements may also be provided to which the Coriolis forces are transmitted by springs. In this case, the verification elements may be suspended in such a manner on the substrate that only a movement in the direction of the Coriolis forces occurs. Interference effects due to a movement of the movable electrodes which are not in the verification direction are thereby suppressed. To ensure an antiphase oscillation of the Coriolis elements, the antiphase oscillation should be clearly differentiated from the in-phase oscillation in terms of frequency. To that end, coupling springs may be provided between drive elements and/or Coriolis elements, or between drive elements and verification elements.

Exemplary embodiments of the present invention are shown in the drawings and are explained in the following description.

DETAILED DESCRIPTION

Figure 1:
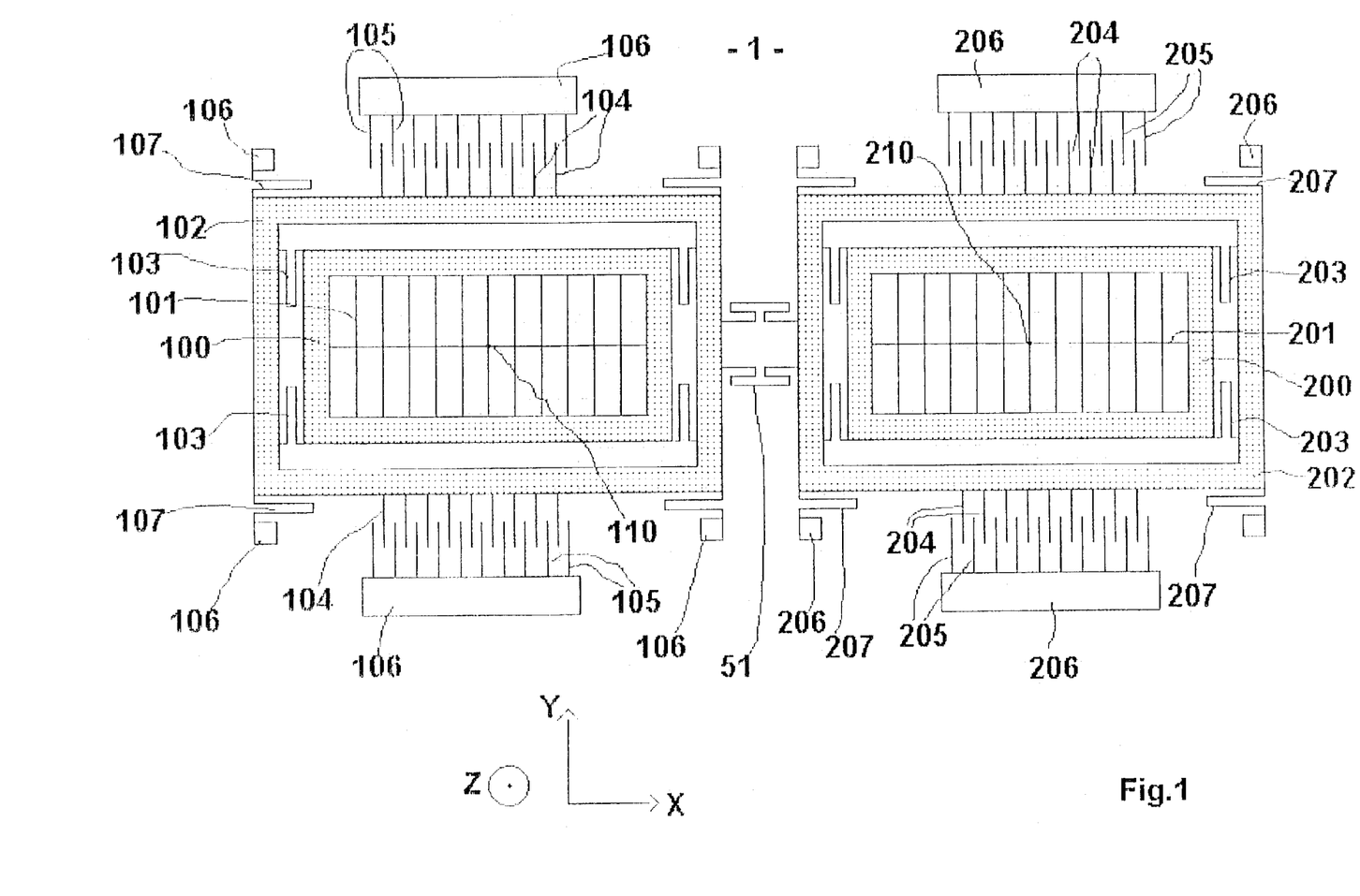
FIG. 1 shows a top view of a first exemplary yaw-rate sensor according to the present invention.
Figures 2, 3:
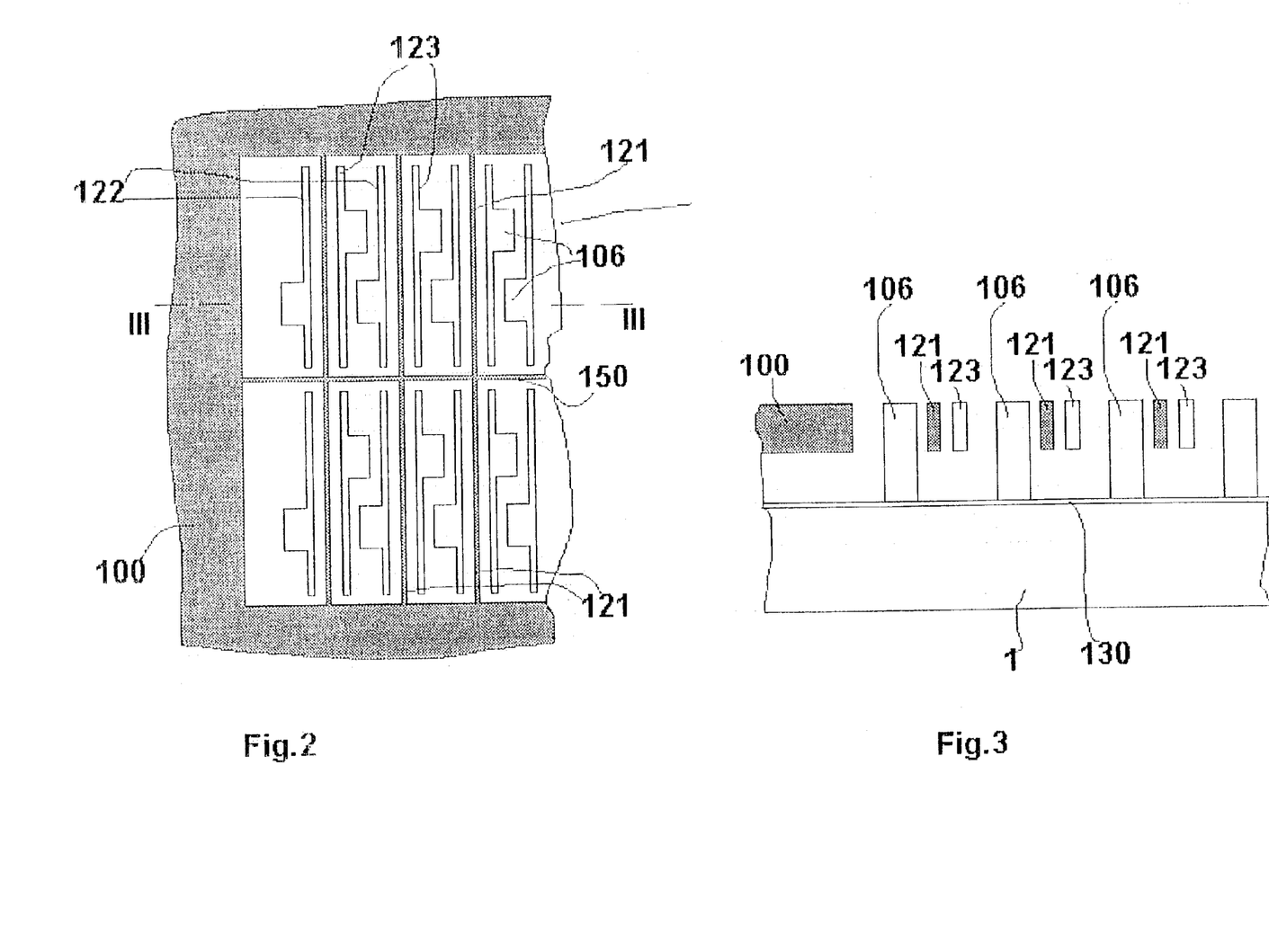
FIG. 2 shows a detail view of the exemplary yaw-rate sensor according to FIG. 1.
FIG. 3 shows a cross-section through FIG. 2.

A first exemplary embodiment according to the present invention is clarified in FIGS. 1–3. FIG. 1 shows a top view of the entire yaw-rate sensor, FIG. 2 shows a detail view of a portion of the yaw-rate sensor and FIG. 3 shows a side view of a cross-section through FIG. 2.

FIG. 1 shows a top view of a substrate 1, not shown more precisely in FIG. 1, in which a first Coriolis element 100 and a second Coriolis element 200 are arranged. First and second Coriolis elements 100, 200 are rectangular, frame-shaped structures. Frame-shaped Coriolis elements 100 and 200 surround detection arrangements 101, 201 which are shown simplified in FIG. 1 as grid lines. The detection arrangements are shown in the detail view of FIG. 2 and explained more precisely below. Frame-shaped Coriolis elements 100, 200 are surrounded by rectangular, frame-shaped drive elements 102, 202. The connection between drive elements 102, 202 and the Coriolis elements is produced-by torsion springs 103, 203. The torsion springs are constructed so that they are yielding (flexible, soft) in the X-direction and stiff in the Y-direction. Secured to drive elements 102, 202 are movable electrodes 104, 204 which grab in a comb-like manner in stationary electrodes 105, 205. Stationary electrodes 105, 205 are fixedly joined to substrate 1 by bearing blocks 106, 206. Moreover, drive elements 102, 202 are connected by springs 107, 207 to further bearing blocks 106, 206 that are fixedly joined to substrate 1.

Thus, the yaw-rate sensor is connected to substrate 1 only via bearing blocks 106, 206. Therefore, both Coriolis elements 100, 200 and drive elements 102, 202 may be moved in any manner desired relative to substrate 1. The movement of these elements is determined only by spring elements 103, 203 and 107, 207.

Springs 107, 207 are configured such that they are yielding in the Y-direction and stiff in the X-direction. Drive elements 102, 202 are thus able to move only along paths which are parallel to the Y-direction. Coriolis elements 100, 200 are connected to drive elements 102, 202 via springs 103, 203. Coriolis elements 100, 200 are therefore able to move only in the X-direction relative to drive elements 102, 202. In response to a movement of drive elements 102, 202 in a direction which is parallel to the Y-direction, Coriolis elements 100, 200 are naturally also moved in this direction. Thus, relative to substrate 1, Coriolis elements 100, 200 are movable both in a direction parallel to the Y-direction and in the X-direction.

A gravitational center 110, 210 of each of Coriolis elements 100, 200 is also indicated for describing the functioning of the sensor. In each case, the gravitational centers lie in the center point of frame-shaped Coriolis elements 100, 200.

Drive elements 102, 202 are excited to oscillate by applying electric voltages between movable electrodes 104, 204 and stationary electrodes 105, 205. Accordingly, Coriolis elements 100, 200 are also induced to oscillate. Gravitational centers 110, 210 of Coriolis elements 100, 200 then each move on an axis which is parallel to the Y-axis. The movements of both Coriolis elements 100, 200 therefore occur in axes which are parallel to one another. In so doing, without the influence of a Coriolis force, (i.e. without a rotation of the substrate about an axis which is perpendicular to substrate 1), the gravitational centers move on straight lines that are parallel to one another. If, in this context, a rotation of substrate 1 about the Z-axis occurs, i.e., about the axis which is perpendicular to substrate 1, then Coriolis forces that are perpendicular to the axis of rotation and perpendicular to the axis of motion act on each of Coriolis elements 100, 200. These forces then act in the X-direction.

Thus, movable electrodes 104, 204, together with stationary electrodes 105, 205 and drive elements 102, 202 form excitation arrangements by which Coriolis elements 100, 200 are induced to oscillate, the oscillation axes of gravitational centers 110, 210 are aligned parallel to one another. At the same time, these axes are arranged at a certain distance relative to each other which amounts at least to the lateral extension of one of Coriolis elements 100, 200 in the X-direction.

The two drive elements 102, 202 are connected by a coupling spring 51. A separation of oscillation modes of drive elements 102, 202 in the Y-direction in terms of frequency is achieved by this coupling spring. Namely, for an in-phase oscillation, the spring constants of springs 107, 207 in the Y-direction must be taken into account. For an antiphase oscillation, in addition to the spring constants of springs 107, 207, the spring constant of coupling spring 51 in the Y-direction must also be considered. The natural frequency of the in-phase oscillation thus differs from the frequency of the antiphase oscillation, which facilitates a targeted excitation of the different oscillation modes. Desired here is in particular an excitation of the antiphase oscillation modes, that is to say, when the left side of the yaw-rate sensor moves downward, the right side should move upward and vice versa. In response to such an antiphase oscillation of the two halves of the yaw-rate sensor, antiphase movements of Coriolis elements 100, 200 in the X-direction are also produced accordingly. Therefore, in response to a rotation, Coriolis elements 100, 200 either move toward each other or away from each other. That is to say, these elements also perform an antiphase oscillation.

Relative to the rest position of Coriolis elements 100, 200, the movement in the X-direction occurs on a common axis. This principle provides that an angular acceleration about the Z-axis is unable to exert any direct influence on the movement of Coriolis elements 100, 200, since they are not deflected by an angular acceleration about the Z-axis. The yaw-rate sensor is therefore particularly insensitive with respect to angular accelerations about the Z-axis.

FIG. 2 shows an enlarged detail view of evaluation arrangement 101 of Coriolis element 100 of FIG. 1. Frame-shaped Coriolis element 100 surrounds evaluation arrangement 101. They are configured as grid-shaped electrodes 121, a plurality of grid-shaped electrodes 121 is provided within the frame-shaped structure of Coriolis element 100. For stabilization, these grid-shaped electrodes 121 are also interconnected by a center bar 150. Each electrode 121 moves together with Coriolis element 100. Electrodes 121 are positioned between stationary electrodes 122, 123 which are secured to substrate 1 by bearings 106. Electrodes 122, 123 therefore take the form of stationary electrodes which do not move relative to the substrate.

FIG. 3 shows a cross-section along line III—III of FIG. 2. FIG. 3 shows, in cross-section, substrate 1 and a printed circuit trace 130 configured on the surface of the substrate. Anchorings 106 are secured to this printed circuit trace 130, and thus are fixedly joined to substrate 1. Bearings 106 and also the electrodes attached thereto are electrically conductive and are parallel-connected through printed circuit trace 130. Each movable electrode 121 is disposed between a stationary electrode 122 and a stationary electrode 123. Thus, two capacitors are formed, first of all between movable electrode 121 and electrodes 122, and secondly between movable electrode 121 and stationary electrodes 123. These two capacitors take the form of differential capacitors, that is to say, in response to an increase of the one capacitance, the other capacitance decreases accordingly. Due to the lateral displacement of bearing blocks 106 of the two electrode groups 122, 123, in each case the corresponding capacitors are able to be connected in parallel to each other by suitable printed circuit traces 130.

In FIG. 3, it is very easy to see in cross-section that Coriolis element 100 is disposed above substrate 1 and that electrodes 121, which are connected to Coriolis element 100, are also arranged above substrate 1. In the cross-section, the section through bearing blocks 106 of electrodes 122 is shown, which are arranged by manner of bearing blocks 106 on printed circuit trace 130, and thus are fixedly connected to substrate 1. Electrodes 123 are shown above the substrate in the cross-section of FIG. 3. However, at another point, they are fixedly connected to substrate 1 via a corresponding printed circuit trace 130 for these electrodes.

Used as the material for substrate 1 and the elements arranged above the substrate, such as Coriolis elements 100, 200, drive elements 102, 202, the springs and electrodes, may be silicon that is made conductive by suitable doping. The substrate may be electrically insulated where it is necessary using insulating layers. However, other materials such as ceramic, glass or metals may also be used for the sensors.

In the exemplary yaw-rate sensors according to FIG. 1, relative to the rest position of gravitational centers 110, 210 of Coriolis elements 100, 200, the movement of the Coriolis elements in the X-direction occurs along the connecting axis of gravitational centers 110, 210, and consequently in response to an antiphase excitation of the oscillations of the Coriolis elements, the Coriolis elements move in the X-direction on a common axis toward each other or away from each other. Thus, the disturbing influence of angular accelerations about the Z-axis may already be suppressed by the mechanical configuration of the yaw-rate sensor.

Figure 4:
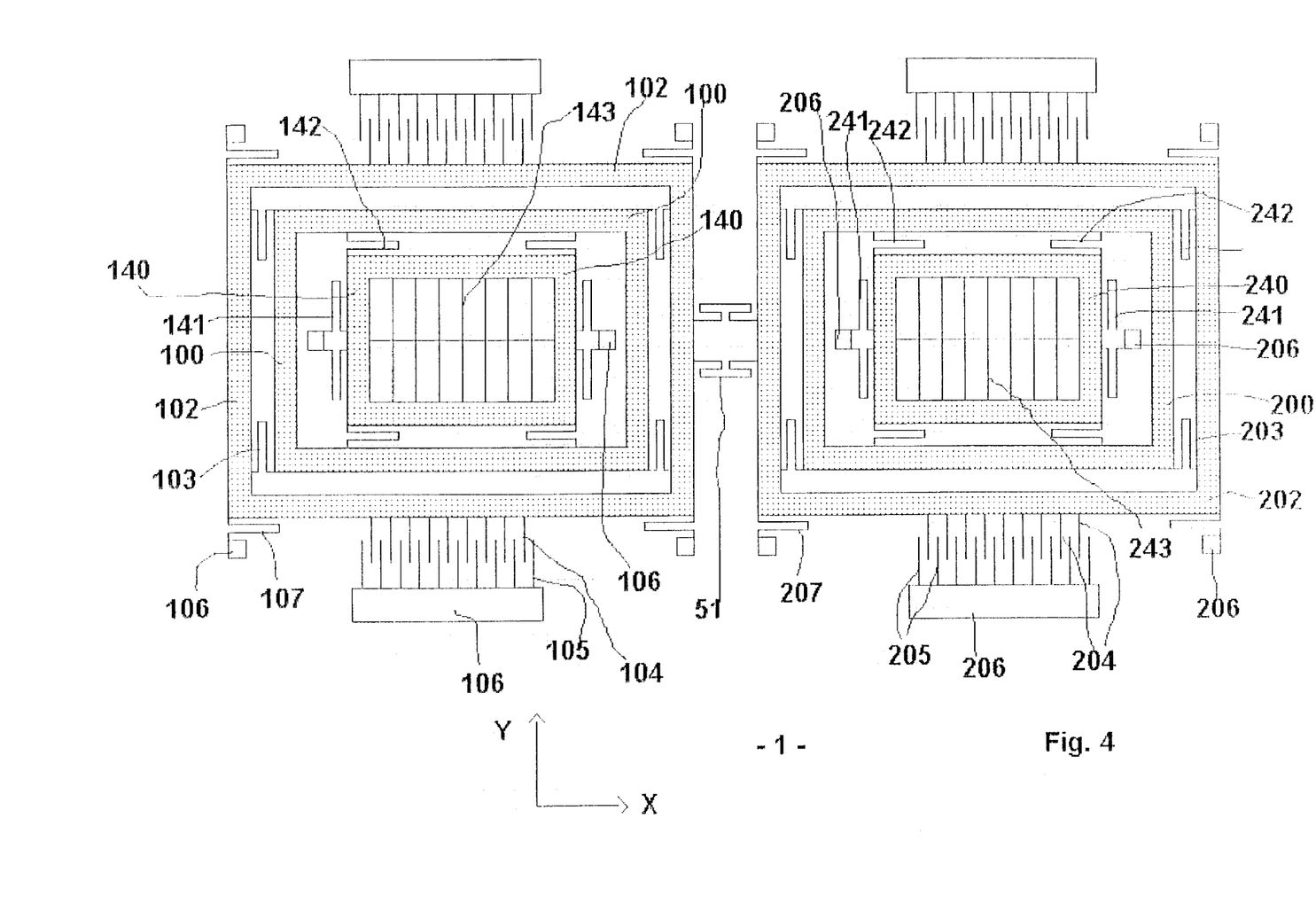
FIG. 4 shows a further exemplary embodiment of yaw-rate sensors in a top view.

FIG. 4 shows the top view of a further exemplary embodiment of a yaw-rate sensor according to the present invention. In FIG. 4, a top view is shown of a substrate 1 on which, as in FIG. 1, Coriolis elements 100, 200 are arranged which are surrounded by drive elements 102, 202. Coriolis elements 100, 200 and drive elements 102, 202 are again connected by springs 103, 203. Drive elements 102, 202 are connected to bearing blocks 106, 206 by springs 107, 207. Movable electrodes 104, 204, stationary electrodes 105, 205 and bearing blocks 106 for stationary electrodes 105, 205 are also provided. The two drive elements 102, 202 are connected by a coupling spring 51. All these elements correspond to the elements as already described in FIG. 1 and perform the same function.

In contrast to FIG. 1, however, to verify the deflection of Coriolis elements 100, 200, in each case a frame-shaped verification element 140, 240 is provided in the interior of frame-shaped Coriolis elements 100, 200.

Verification elements 140, 240 are implemented as rectangular frame structures that are connected by spring elements 141, 241 to bearing blocks 106, 206 to substrate 1. Spring elements 141, 241 are yielding in the X-direction and stiff in the Y-direction, and thus allows only for verification frames 140, 240 to be deflectable in the X-direction. Verification frames 140, 240 are connected to corresponding Coriolis elements 100, 200 by spring elements 142, 242. Spring elements 142, 242 are configured to be yielding in the Y-direction and stiff in the X-direction, and thus transmit the Coriolis forces in the X-direction particularly well. Arranged inside verification frames 140, 240 are again grid-shaped verification electrodes 143, 243, which are only alluded to in FIG. 4. A detailed view of these elements corresponds again to FIGS. 2 and 3.

The grid-shaped electrodes 143, 243 are movable only in the X-direction, and thus no lateral movement occurs relative to the stationary electrodes. In FIG. 1 and in the detail view according to FIG. 2, movable electrodes 121 are directly connected to Coriolis element 100, so that these movable electrodes perform a movement both in the X-direction and in the Y-direction. The movement in the X-direction is necessary for measuring the deflection of Coriolis element 100 in the X-direction. However, the movement in the Y-direction is not desired for the measurement, and may be a source of errors. In FIG. 4, however, verification frames 140, 240 and their anchorings via springs 141, 241 to substrate 1 are configured such that movable electrodes 143, 243 execute a movement only in the X-direction. Therefore, a potential cause for interferences in the measuring signal is eliminated.

Figure 5:
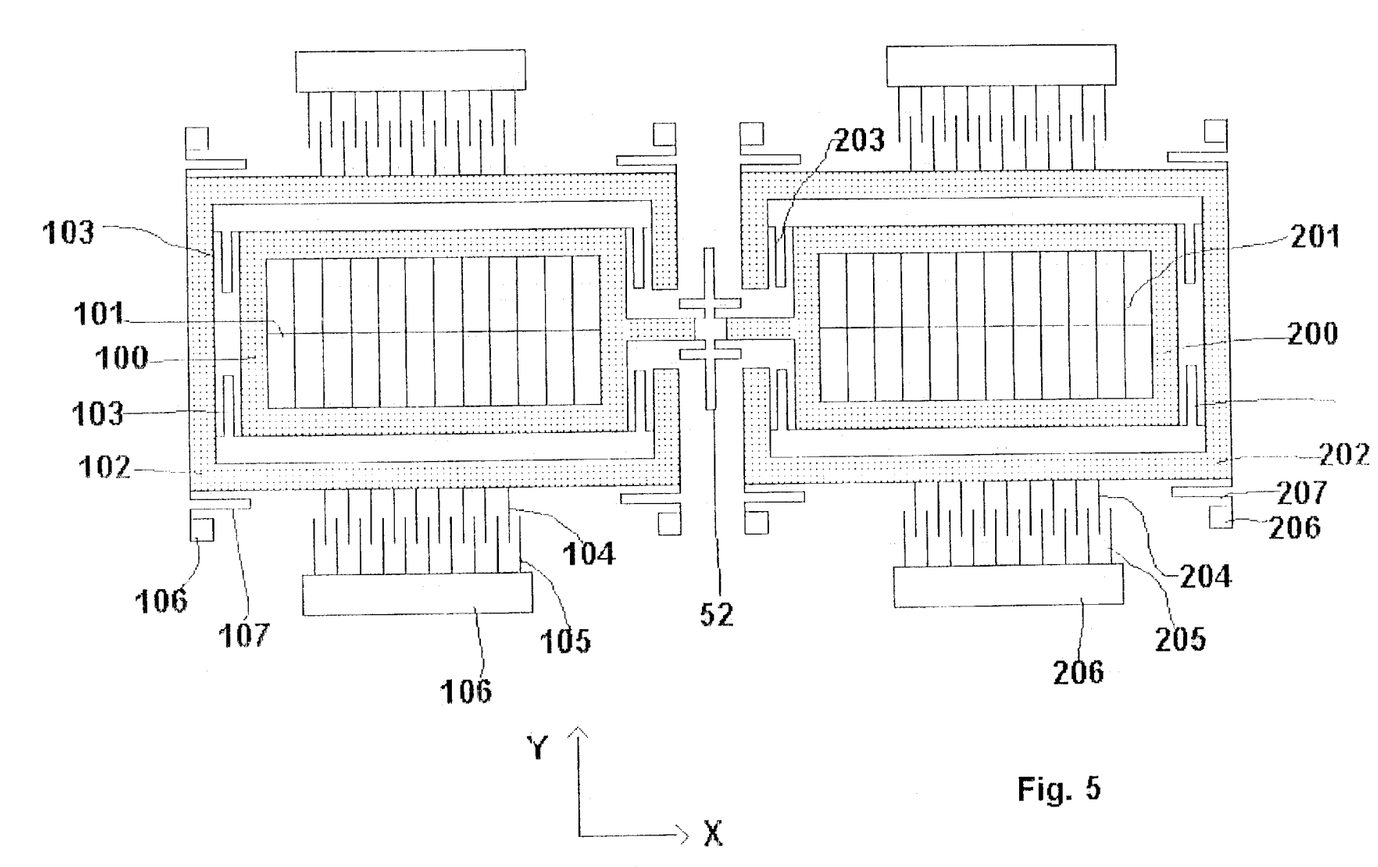
FIG. 5 shows a further exemplary embodiment of yaw-rate sensors in a top view.

FIG. 5 shows a further exemplary embodiment. Elements 100, 200, 103, 203, 104, 204, 105, 205, 106, 206, 107, 207 correspond to the elements known from FIG. 1 and also serve the same functions. In contrast to FIG. 1, however, frame-shaped drive elements 102, 202 are not configured as complete frames, but rather as open frames. A direct coupling of the two Coriolis elements 100, 200 may be produced using a coupling spring 52. This coupling spring 52 now effects a direct coupling of the oscillations of Coriolis elements 100, 200. In response to an in-phase oscillation of the two Coriolis elements 100 100, 200, spring 52 is not deformed, so that it is not necessary to consider the spring constant of spring 52 for this oscillation mode. However, in the case of an antiphase oscillation of Coriolis elements 100, 200, the spring constant of spring 52 must be taken into account, since this spring is deformed during this type of oscillation. The natural frequencies of the in-phase and antiphase oscillations of Coriolis elements 100, 200 therefore differ in the frequency, which means a targeted excitation of the oscillation modes, particularly the antiphase oscillation modes, may be performed. This is implemented by selecting appropriate excitation frequencies for the electric signals at stationary and movable electrodes 104, 204, 105, 205. A direct coupling of drive elements 102, 202 as was shown in FIG. 1 may be omitted in this case. In addition, due to the configuration of coupling spring 52, a separation of oscillation modes of drive elements 102, 202 in the Y-direction in terms of frequency is achieved. Namely, for an in-phase oscillation, the spring constants of springs 107, 207 in the Y-direction must be taken into account. For an antiphase oscillation, in addition to the spring constants of springs 107, 207, the spring constant of coupling spring 52 in the Y-direction must also be considered. The natural frequency of the in-phase oscillation thus differs from the frequency of the antiphase oscillation, which facilitates a targeted excitation of the different oscillation modes. A specific excitation of the antiphase oscillation mode is particularly desired here, as well.

Figure 6:
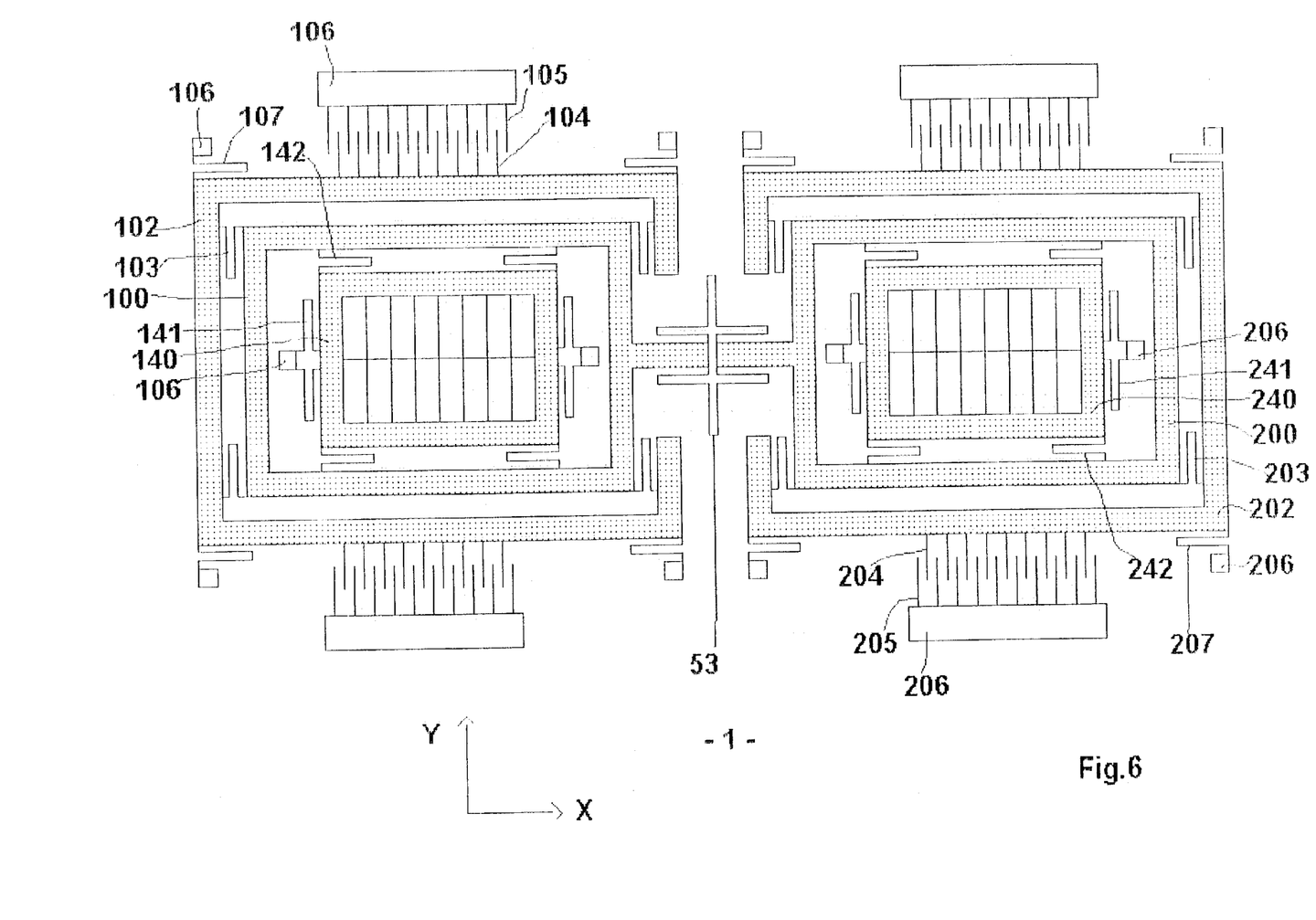
FIG. 6 shows a further exemplary embodiment of yaw-rate sensors in a top view.

FIG. 6 shows a further exemplary embodiment which corresponds to FIG. 4. The reference numerals also designate the same objects having the same functions as in FIG. 4. In contrast to FIG. 4, however, drive elements 102, 202 are not configured as closed frames, but rather as frames which are not closed on the sides facing one another. This then permits the arrangement of a coupling spring 53 between Coriolis elements 100, 200. The coupling spring is constructed so that it is yielding both in the Y-direction and in the X-direction. Spring 53 thus couples the oscillations of Coriolis elements 100, 200 both in the Y-direction and in the X-direction in such a manner that the antiphase and in-phase oscillation modes differ from each other in each case in the Y-direction and in the X-direction. The antiphase oscillation modes may therefore be applied in a targeted manner.

Figure 7:
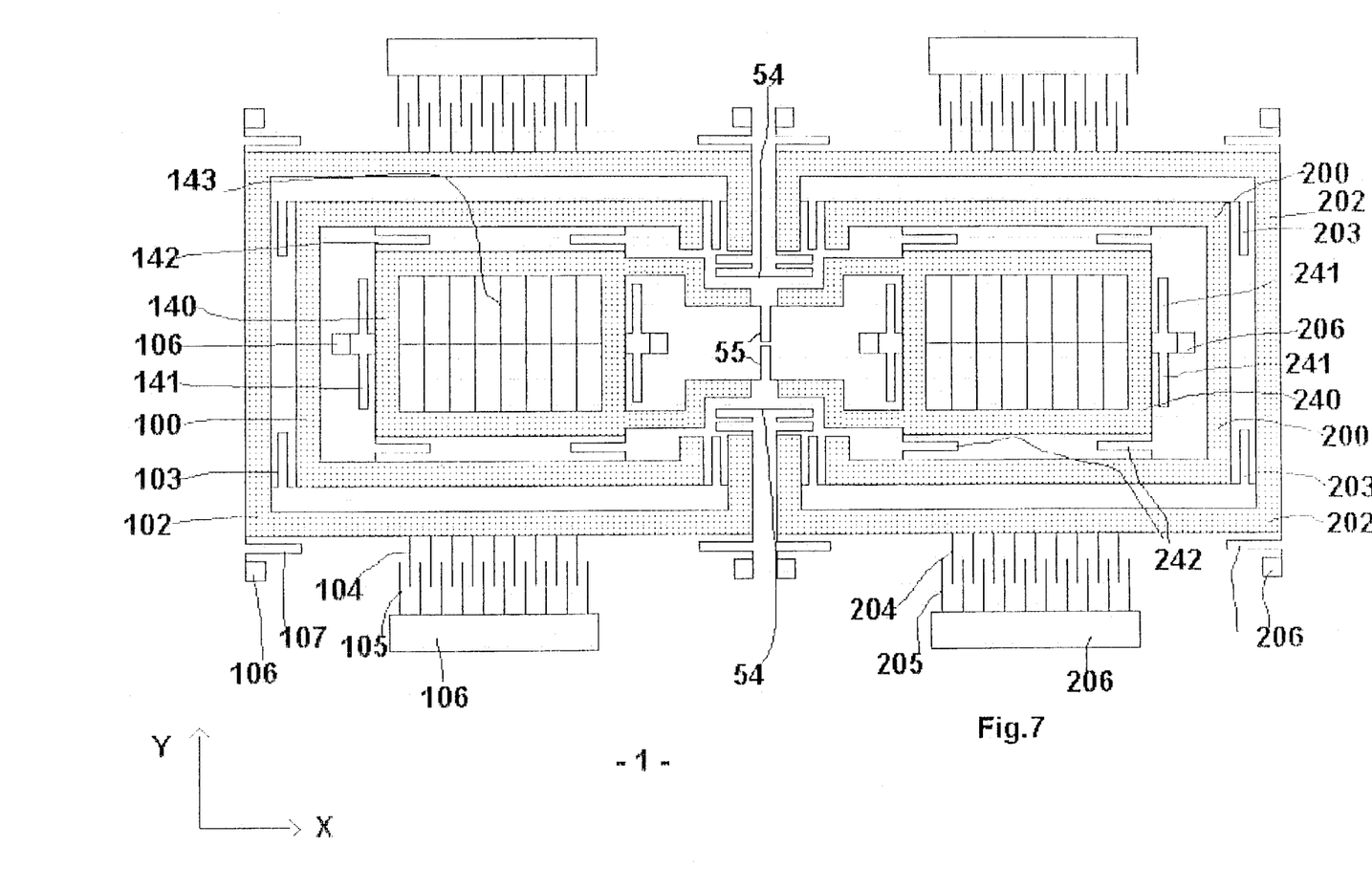
FIG. 7 shows a further exemplary embodiment of yaw-rate sensors in a top view.

FIG. 7 shows another exemplary embodiment of the present invention which corresponds to the exemplary embodiment in FIG. 4. The reference numerals again designate the same objects having the same functions as in FIG. 4. However, in contrast to FIG. 4, here both drive elements 102, 202 and Coriolis elements 100, 200 are not configured as closed frames, but rather as open frames which are open on the sides assigned to each other. This measure allows for the coupling of evaluation arrangements 143, 243, particularly verification frames 140, 240 to each other by a coupling spring 55. Drive elements 102, 202 are also coupled to each other by a coupling spring 54. A coupling of evaluation arrangements 143, 243 and of verification frames 140, 240, respectively, in the X-direction is achieved by coupling spring 55 in such a manner that the natural frequencies of the in-phase and antiphase oscillations differ from each other in the X-direction. Due to the coupling of drive elements 102, 202, the natural frequencies of the in-phase and phase-opposition oscillations in the Y-direction differ from each other in terms of frequency. Thus, by the selection of the proper excitation frequencies, it may be ensured that the elements of the right and left side in each case oscillate reciprocally relative to each other, i.e., that drive elements 102, 202 and also detection elements 140, 240 in each case oscillate in phase opposition to each other.

What is claimed is:

1. A yaw-rate sensor comprising:
    a first Coriolis element;
    a second Coriolis element;
    an excitation arrangement to induce the first Coriolis element and the second Coriolis element to oscillate parallel to a first axis;
    a substrate; and
    a detection arrangement to verify a deflection of the first Coriolis element and the second Coriolis element based on a Coriolis force in a second axis that is perpendicular to the first axis, the first axis and the second axis being parallel to a surface of the substrate;
    wherein the first Coriolis element and the second Coriolis element are arranged side-by-side above a surface of a substrate, and the first Coriolis element and the second Coriolis element oscillate in phase opposition to each other on a first path and a second path that, without an effect of the Coriolis force, are a first straight line and a second straight line that are parallel.

2. The yaw-rate sensor of claim 1, wherein the first Coriolis element includes a first gravitational center and the second Coriolis element includes a second gravitational center, and the first straight line and the second straight line are perpendicular to a third straight line that extends through the first gravitational center and the second gravitational center.

3. The yaw-rate sensor of claim 1, wherein the first Coriolis element includes a first drive element connected by a first plurality of springs and the second Coriolis element includes a second drive element connected by a second plurality of springs, the first plurality of springs and the second plurality of springs being stiff in the first axis and yielding in the second axis.

4. The yaw-rate sensor of claim 1, wherein the first drive element and the second drive element are connected to the substrate by a third plurality of springs that are yielding in the first axis and stiff in the second axis X, and the excitation arrangement is connected to the first drive element and the second drive element.

5. The yaw-rate sensor of claim 4, wherein the excitation arrangement includes a plurality of electrostatic comb drives.

6. The yaw-rate sensor of claim 1, wherein the detection arrangement includes a plurality of movable electrodes connected to the first Coriolis element and the second Coriolis element, the plurality of movable electrodes being arranged opposite a plurality of stationary electrodes connected to the substrate.

7. The yaw-rate sensor of claim 1, wherein for the detection arrangement includes a first verification element and a second verification element that are connected to the first Coriolis element and the second Coriolis element by a first plurality of springs that are yielding in the first axis and stiff in the second axis.

8. The yaw-rate sensor of claim 7, wherein the first verification element and the second verification element include a plurality of movable electrodes that are arranged opposite a plurality of stationary electrodes that are connected to the substrate.

9. The yaw-rate sensor of claim 7, wherein the first verification element and the second verification element are connected to the substrate by a second plurality of springs that are stiff in the first axis and yielding in the second axis.

10. The yaw-rate sensor of claim 2, wherein the first drive element and the second drive element are interconnected by a coupling spring.

11. The yaw-rate sensor of claim 1, wherein the first Coriolis element and the second Coriolis element are interconnected by a plurality of coupling springs.

12. The yaw-rate sensor of claim 2, wherein the detection arrangement includes a first verification element and a second verification element that are connected to the first Coriolis element and the second Coriolis element by a third plurality of springs that are yielding in the first axis and stiff in the second axis.

13. The yaw-rate sensor of claim 12, wherein the first drive element and the second drive element are interconnected by a plurality of coupling springs, and the first verification element and the second verification element are interconnected by a second plurality of coupling springs.

* * * * *